United States Patent
Sato et al.

(10) Patent No.: US 11,870,925 B2
(45) Date of Patent: Jan. 9, 2024

(54) ACCOMMODATION DEVICE WITH AIR BLOWING FUNCTION

(71) Applicant: TOYODA GOSEI CO., LTD., Kiyosu (JP)

(72) Inventors: Makoto Sato, Kiyosu (JP); Takahiro Mukai, Kiyosu (JP); Hiroshi Sobue, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 70 days.

(21) Appl. No.: 17/589,022

(22) Filed: Jan. 31, 2022

(65) Prior Publication Data

US 2022/0256023 A1  Aug. 11, 2022

(30) Foreign Application Priority Data

Feb. 5, 2021 (JP) .................................. 2021-017865

(51) Int. Cl.
*H04M 1/06* (2006.01)
*H04M 1/02* (2006.01)

(52) U.S. Cl.
CPC ............ *H04M 1/06* (2013.01); *H04M 1/0202* (2013.01)

(58) Field of Classification Search
CPC ........ H04M 1/06; H04M 1/0202; H04M 1/18; H04M 1/6075; H04M 1/04; B60R 7/04; H05K 7/20145; H05K 7/20209; H05K 7/20845

See application file for complete search history.

(56) References Cited

U.S. PATENT DOCUMENTS

| | | | |
|---|---|---|---|
| 11,334,128 B1* | 5/2022 | Dickover | G06F 1/203 |
| 2011/0252601 A1* | 10/2011 | Lin | G06F 1/1681 |
| | | | 16/280 |
| 2014/0007594 A1 | 1/2014 | Lofy et al. | |
| 2014/0062392 A1 | 3/2014 | Lofy et al. | |
| 2017/0164513 A1 | 6/2017 | Lofy et al. | |
| 2017/0164515 A1 | 6/2017 | Lofy et al. | |
| 2018/0199464 A1 | 7/2018 | Lofy et al. | |
| 2019/0261535 A1 | 8/2019 | Lofy et al. | |
| 2021/0175746 A1* | 6/2021 | Mukai | B60R 16/02 |

FOREIGN PATENT DOCUMENTS

| | | |
|---|---|---|
| JP | 2015-524997 A | 8/2015 |
| JP | 6123604 B | 5/2017 |

* cited by examiner

*Primary Examiner* — Sam Bhattacharya
(74) *Attorney, Agent, or Firm* — POSZ LAW GROUP, PLC

(57) ABSTRACT

An accommodation device with an air blowing function includes: an accommodation portion that is formed with an opening portion on an upper surface and accommodates a portable electronic device; a support portion, arranged so as to protrude from a side surface of the accommodation portion into the accommodation portion, the support portion configured to contact with side surfaces or upper and lower surfaces of the portable electronic device accommodated in the accommodation portion and hold the portable electronic device so as to pinch the portable electronic device; and a blower unit that blows air into the accommodation portion. The support portion has an air outlet for guiding the air sent out by the blower unit to the accommodation portion.

8 Claims, 5 Drawing Sheets

ACCOMMODATION DEVICE WITH AIR BLOWING FUNCTION

CROSS-REFERENCE TO RELATED APPLICATION(S)

This application is based upon and claims the benefit of priority from prior Japanese patent application No. 2021-017865 filed on Feb. 5, 2021, the entire contents of which are incorporated herein by reference.

BACKGROUND

1. Field of the Invention

The present invention relates to an accommodation device with an air blowing function.

2. Description of the Related Art

In a recent year, an accommodation device which is mounted on a vehicle or the like and accommodates a portable electronic device such as a smartphone or a mobile phone has been known (for example, JP-T-2015-524997). The accommodation device described in JP-T-2015-524997 includes an accommodation portion for accommodating a portable electronic device and a fluid transfer device for air-cooling an accommodation space in the accommodation portion. In the accommodation device, a side wall of the accommodation portion is provided with a cavity for taking in air outside the accommodation portion into the accommodation portion. The cavity is provided in the side wall where a front surface or a back surface of the portable electronic device is in contact. When the fluid transfer device is operated, air outside the accommodation portion is sent into the accommodation portion through the cavity. Therefore, it is possible to prevent temperature of the portable electronic device accommodated in the accommodation portion from rising during charging or the like due to the operation of the fluid transfer device.

However, in the accommodation device described above, the air sent into the accommodation portion through the cavity travels in a direction orthogonal to the front surface or the back surface of the portable electronic device accommodated in the accommodation portion. Therefore, in the accommodation device, after the air hits the front surface or the back surface of the portable electronic device, the warmed air tends to stay in the accommodation portion and air cooling efficiency of the portable electronic device is not so preferable.

SUMMARY

The invention is made in view of such a point and an object of the invention is to provide an accommodation device with an air blowing function in which air cooling efficiency of a portable electronic device accommodated in an accommodation portion is improved.

According to an aspect of the present invention, there is provided an accommodation device with an air blowing function including: an accommodation portion that is formed with an opening portion on an upper surface and accommodates a portable electronic device; a support portion, arranged so as to protrude from a side surface of the accommodation portion into the accommodation portion, the support portion configured to contact with side surfaces or upper and lower surfaces of the portable electronic device accommodated in the accommodation portion and hold the portable electronic device so as to pinch the portable electronic device; and a blower unit that blows air into the accommodation portion, where the support portion has an air outlet for guiding the air sent out by the blower unit to the accommodation portion.

According to the configuration, the air outlet which guides the air from the blower unit into the accommodation portion is provided in the support portion which is in contact with the portable electronic device accommodated in the accommodation portion. Therefore, the air guided from the blower unit into the accommodation portion is sent into the accommodation portion in an immediate vicinity of the portable electronic device and the air easily hits the portable electronic device directly. Therefore, the air cooling efficiency of the portable electronic device accommodated in the accommodation portion can be improved.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
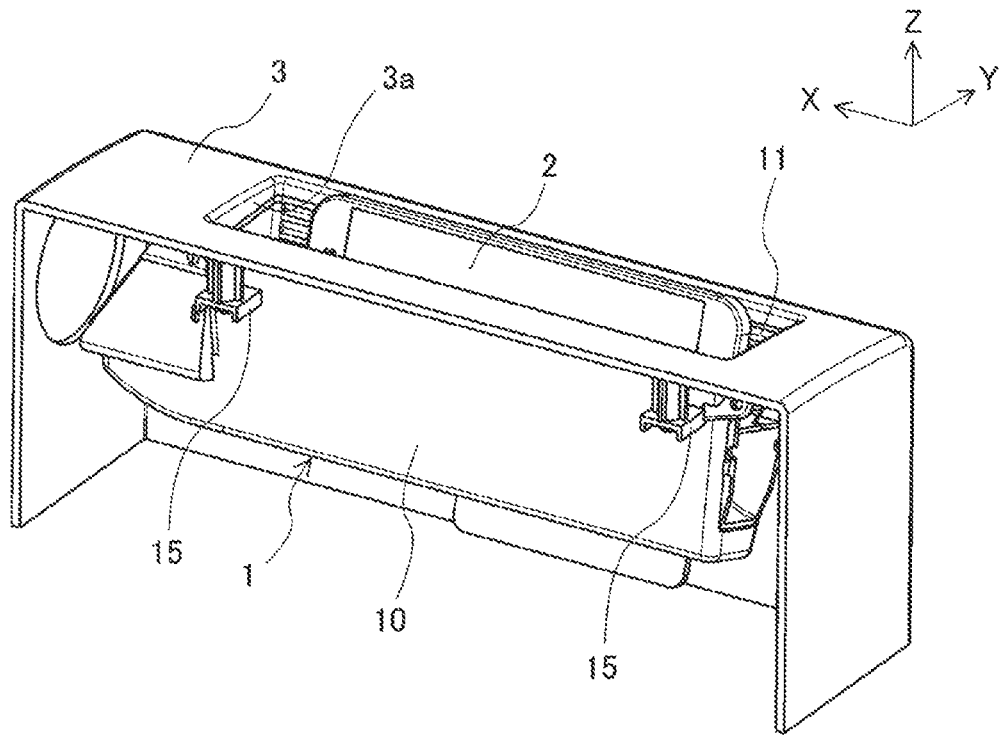
FIG. 1 is a perspective view illustrating a state in which an accommodation device with an air blowing function according to an embodiment is attached to a vehicle interior component.
Figure 2:
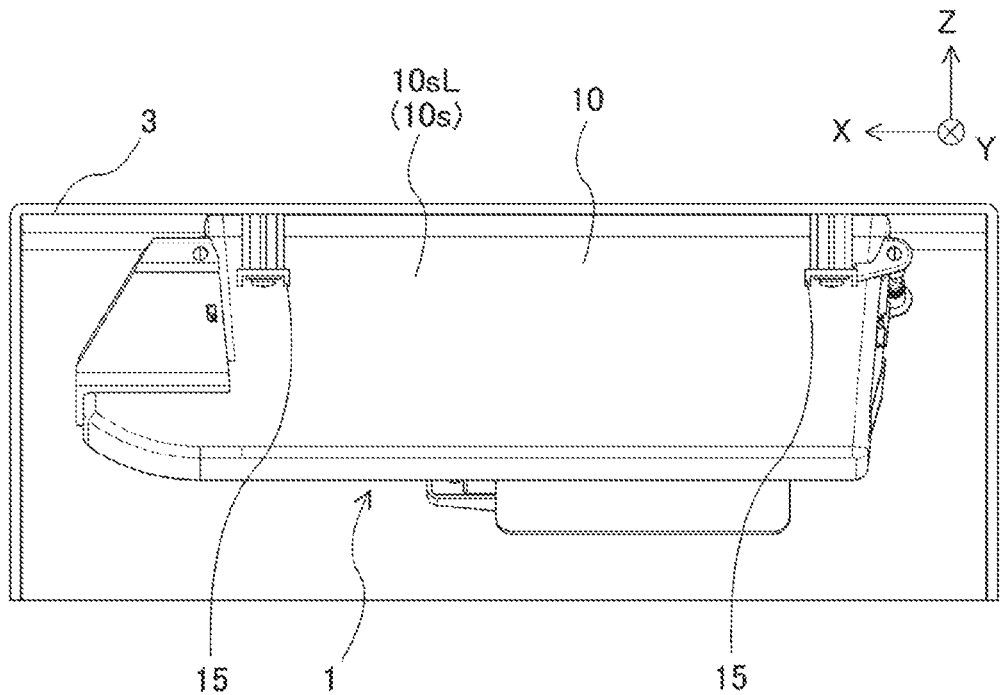
FIG. 2 is a side view of the accommodation device with the air blowing function attached to the vehicle interior component of the embodiment.
Figure 3:
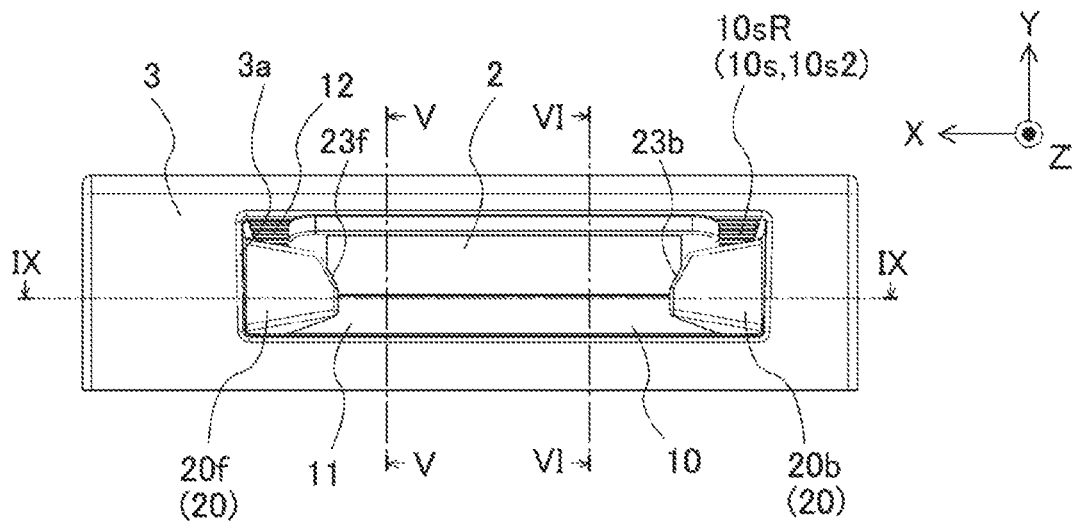
FIG. 3 is a top view of the accommodation device with the air blowing function attached to the vehicle interior component of the embodiment.
Figure 4:
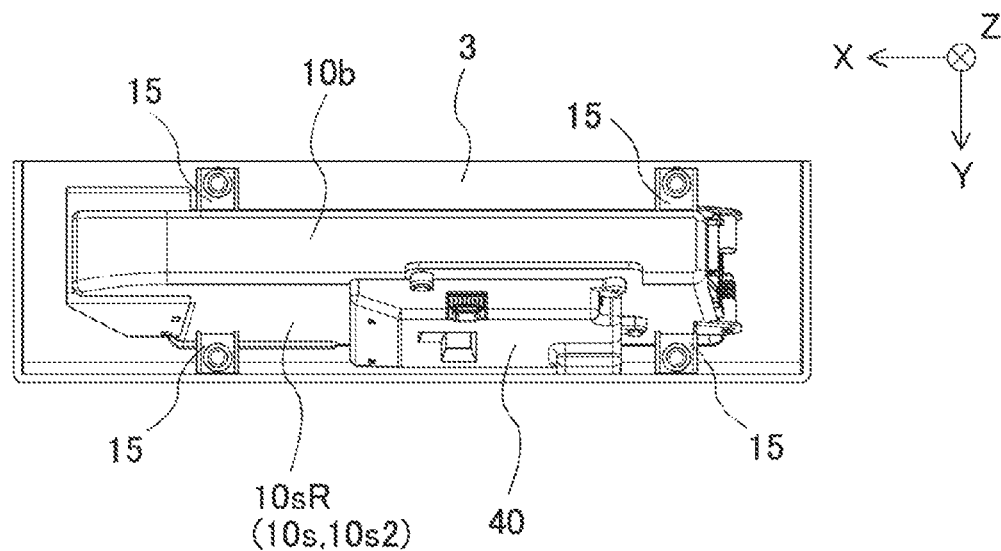
FIG. 4 is a bottom view of the accommodation device with the air blowing function attached to the vehicle interior component of the embodiment.

A specific embodiment of an accommodation device with an air blowing function according to the invention will be described with reference to the drawings.

An accommodation device with an air blowing function 1 of an embodiment is a device for accommodating a portable electronic device 2 such as a smartphone or a mobile phone of an occupant boarding a vehicle. Hereinafter, the accommodation device with the air blowing function 1 is simply referred to as an accommodation device 1. The accommodation device 1 is attached to a vehicle interior component 3 such as a center console. The accommodation device 1 is assumed to arrange and accommodate the portable electronic device 2 in a state where the portable electronic device 2 is along a vehicle front-rear direction X. Further, as appropriate, two directions orthogonal to the vehicle front-rear direction X are respectively referred to as a vehicle width direction Y and an up-down direction Z.

The portable electronic device 2 is formed in a shape of a thin square plate. A thickness between a front surface, which is a display surface of the portable electronic device 2, and a back surface thereof is smaller than a distance (that is, a height) between upper and lower surfaces of the portable electronic device 2 and a distance (that is, a width) between left and right side surfaces. The upper and lower surfaces and the left and right side surfaces of the portable electronic device 2 are not surfaces based on the vehicle. The upper and lower surfaces of the portable electronic device 2 are a surface forming an upper side and a surface forming a lower side when a reference display is made on the display surface of the portable electronic device 2. Further, the left and right side surfaces or the side surfaces of the portable electronic device 2 are a surface forming a left side and a surface forming a right side when the reference display is made on the display surface of the portable electronic device 2.

Further, the vehicle interior component 3 is formed in a box shape. An upper wall of the vehicle interior component 3 forms an upper panel of the center console. The vehicle interior component 3 has an opening 3a provided on an upper surface so that the portable electronic device 2 can be inserted and removed.

As illustrated in FIGS. 1 to 8, the accommodation device 1 includes an accommodation portion 10, a support portion 20, a blower unit 30, and a wireless power supply unit 40.

The accommodation portion 10 is a box body for accommodating the portable electronic device 2. The accommodation portion 10 is formed in a box shape having a substantially rectangular parallelepiped shape. The accommodation portion 10 is formed by a bottom wall 10b and four side walls 10s and has an accommodation space 11. The accommodation space 11 is surrounded by the bottom wall 10b and the four side walls 10s. The accommodation space 11 is formed so that an area of an upper portion is larger than an area of a lower portion.

The four side walls 10s are formed such that a distance between the two side walls (hereafter, referred to as the left and right side walls.) 10sL and 10sR facing each other in the vehicle width direction Y is shorter than a distance between the two side walls (hereafter, referred to as the front and rear side walls.) 10sF and 10sB facing each other in the vehicle front-rear direction X. The accommodation space 11 extends in the vehicle front-rear direction X and in the up-down direction Z and accommodates the portable electronic device 2 in a state where the portable electronic device 2 is along the vehicle front-rear direction X and placed vertically. The accommodation space 11 is formed in a size capable of accommodating the portable electronic device 2 within a predetermined size.

The accommodation portion 10 is formed so that a lower portion on a front side of the accommodation space 11 in the vehicle front-rear direction X protrudes forward. The rear side wall 10sB extends substantially in the up-down direction Z, while the front side wall 10sF is inclined with respect to the up-down direction Z so as to be located on the front side from an upper portion to a lower portion.

Figure 5:
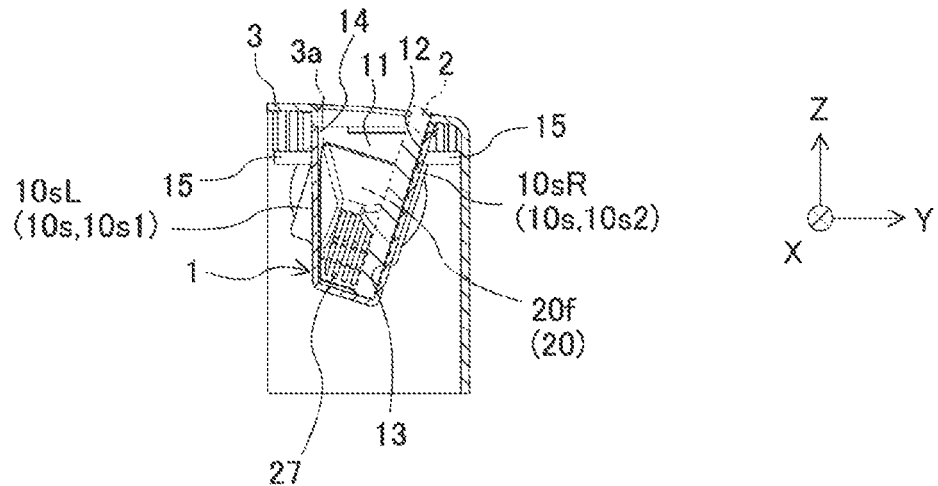
FIG. 5 is a cross-sectional view taken along the line V-V illustrated in FIG. 3.
Figure 6:
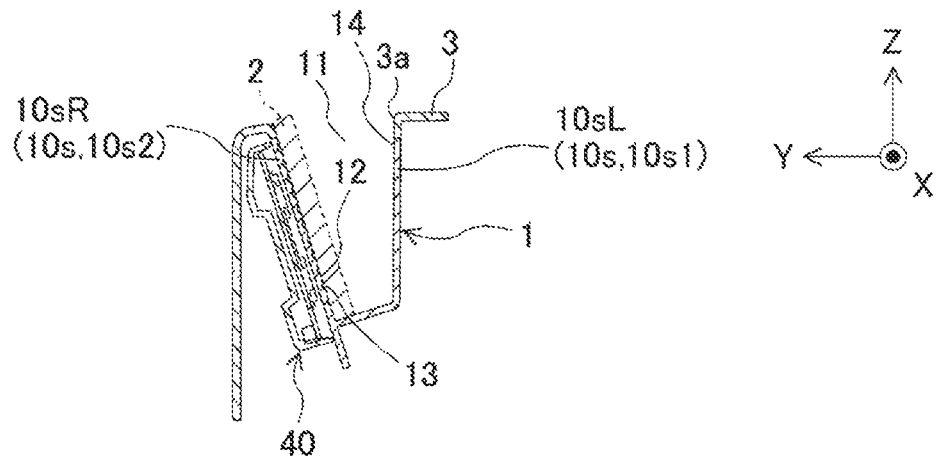
FIG. 6 is a cross-sectional view taken along the line VI-VI illustrated in FIG. 3.
Figure 7:
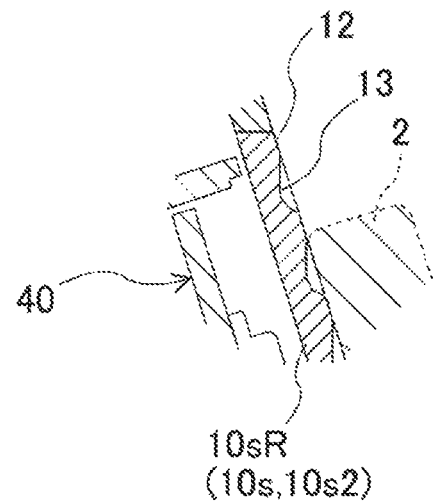
FIG. 7 is an enlarged view of a main part of the accommodation device with the air blowing function of the embodiment.

The accommodation portion 10 is formed so that the portable electronic device 2 accommodated in the accommodation space 11 can be accommodated in the accommodation space 11 in a predetermined posture state. Specifically, as illustrated in FIGS. 5 and 6, the bottom wall 10b is inclined with respect to the horizontal so that the portable electronic device 2 accommodated in the accommodation space 11 is inclined to one side (for example, the right direction) of the vehicle width direction Y from the lower portion to the upper portion. Further, one (for example, the side wall 10sL on the left side) of the left and right side walls 10sL and 10sR is a vertical wall extending in the up-down direction Z and the other (for example, the side wall 10sR on the right side) is an inclined wall which is inclined so as to be inclined to one side (for example, the right direction) of the vehicle width direction Y from the lower portion to the upper portion. Hereinafter, the left or right side wall 10sL or 10sR, which is a vertical wall, is referred to as a vertical side wall 10s1 and the left or right side wall 10sL or 10sR, which is an inclined wall, is referred to as an inclined side wall 10s2.

The accommodation portion 10 has an inclined surface 12 which is inclined so as to face diagonally upward. The inclined surface 12 is formed on an inner surface of the inclined side wall 10s2. The portable electronic device 2 is accommodated in the accommodation space 11 in a posture in which the bottom surface or the side surface is in contact with the bottom wall 10b and the back surface or the front surface is in contact with the inclined surface 12 which is the inner surface of the inclined side wall 10s2.

The inclined surface 12 has a guide groove 13. A plurality of guide grooves 13 extend along the vehicle front-rear direction X and are provided side by side in the up-down direction Z. The guide groove 13 is a groove which guides the air guided to the inside of the accommodation portion 10, that is, to the accommodation space 11, in the vehicle front-rear direction X, which is the horizontal direction, as described below. The guide groove 13 promotes traveling of the air along the vehicle front-rear direction X. That is, the guide groove 13 has a function of forming a gap extending in the horizontal direction between the inclined surface 12 and the portable electronic device 2 in contact with the inclined surface 12 and increasing air cooling efficiency of the portable electronic device 2.

The accommodation portion 10 has an opening portion 14. The opening portion 14 is an opening formed on the upper surface of the accommodation portion 10. The opening portion 14 is formed in a rectangular shape and has a size which matches the size of the portable electronic device 2 to be accommodated. The opening portion 14 is formed in a shape which matches the opening 3a of the vehicle interior component 3. The portable electronic device 2 is inserted and removed through the opening portion 14 between the external space and the accommodation space 11.

A mounting portion 15 is provided on the side wall 10s. The mounting portion 15 is a portion for attaching and fixing a main body of the accommodation portion 10 to the vehicle interior component 3. For example, four mounting portions 15 are provided on outer surfaces of the side walls 10s. The accommodation portion 10 is attached and fixed to the vehicle interior component 3 at the mounting portions 15 with bolts or the like.

The support portion 20 is a portion which holds the portable electronic device 2 accommodated in the accommodation space 11 in the accommodation portion 10. A pair of support portions 20 are provided. The support portions 20 are in contact with the side surfaces or the upper and lower surfaces different from the front surface and the back surface of the portable electronic device 2 and hold the portable electronic device 2 so as to pinch the portable electronic device 2. When the portable electronic device 2 is accommodated in the accommodation space 11, the portable electronic device 2 is pinched and held by the pair of support portions 20.

The front and rear side walls 10sF and 10sB of the accommodation portion 10 are provided with through holes 16f and 16b penetrating in the vehicle front-rear direction X. Each of the through holes 16f and 16b is formed in a rectangular shape which is relatively long in the up-down direction Z. Each of the through holes 16f and 16b has a size corresponding to the size of the support portion 20. The support portions 20 are respectively provided corresponding to the front and rear side walls 10sF and 10sB and are arranged so as to protrude from inner surfaces of the front and rear side walls 10sF and 10sB to the accommodation space 11 in the accommodation portion 10 through the through holes 16f and 16b. Hereinafter, the support portion 20 arranged on the front side wall 10sF is referred to as a front support portion 20f and the support portion 20 arranged on the rear side wall 10sB is referred to as a rear support portion 20b.

Figure 8:
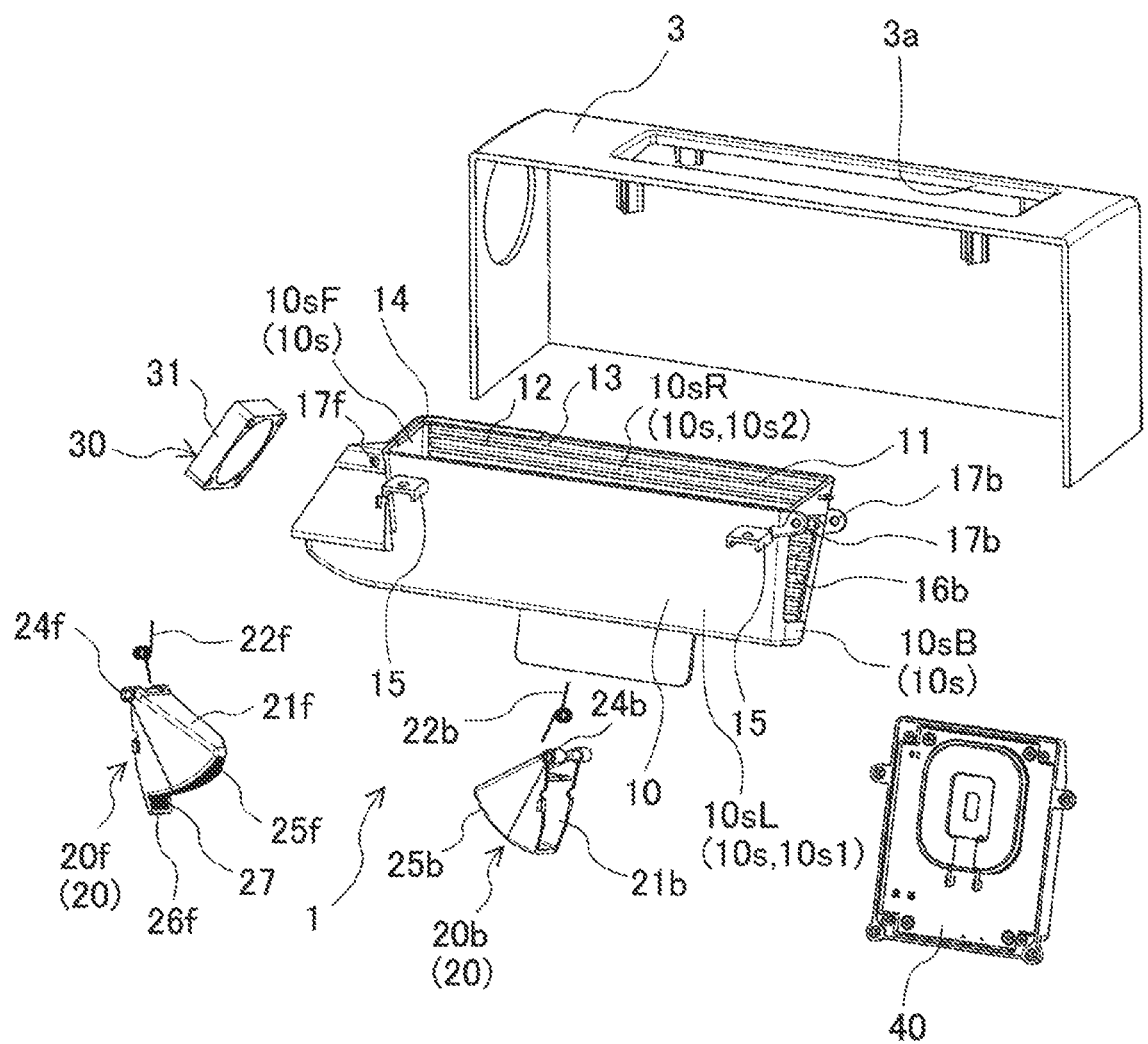
FIG. 8 is an exploded view of the accommodation device with the air blowing function attached to the vehicle interior component of the embodiment.

The front support portion 20f and the rear support portion 20b are formed in a shape symmetrical to each other. As illustrated in FIG. 8, the front support portion 20f has a main body member 21f and an urging member 22f. Further, the rear support portion 20b has a main body member 21b and an urging member 22b.

In the front support portion 20f, the main body member 21f is firmed in a V shape in cross section so that a vertical central portion protrudes rearward in the vehicle front-rear direction X, that is, inward of the accommodation space 11 with respect to upper and lower portions. A tip portion of the vertical central portion protruding rearward of the main body member 21f is in contact with the portable electronic device 2 accommodated in the accommodation space 11 and holds the portable electronic device 2. The tip portion has a notch portion 23f.

The notch portion 23f is formed in a shape which encourages the portable electronic device 2 accommodated in the accommodation space 11 to fit in the accommodation space 11 in the above-described predetermined posture state. In particular, the notch portion 23f has an inclined surface which moves the portable electronic device 2 in a direction in contact with the inclined surface 12 of the inclined side wall 10s2 when the pair of support portions 20 pinch the portable electronic device 2 accommodated in the accommodation space 11.

The main body member 21f has a rotating shaft portion 24f, an outer edge portion 25f, and a protruding portion 26f. The main body member 21f is swingably supported by the accommodation portion 10. The rotating shaft portion 24f is a shaft body which serves as a swing center of the main body member 21f. The rotating shaft portion 24f is provided in an upper portion of the main body member 21f. The rotating shaft portion 24f is inserted into a shaft hole 17f which horizontally extends and is provided in a vicinity of the through hole 16f in the upper portion of the accommodation portion 10. The main body member 21f swings with the rotating shaft portion 24f as the swing center so that a lower portion below the rotating shaft portion 24f moves in the vehicle front-rear direction X through the through hole 16f.

The swing of the main body member 21f is regulated within a predetermined range by a regulating member (not illustrated).

The outer edge portion 25f is a planar portion located on a peripheral edge when the rotating shaft portion 24f is centered. The outer edge portion 25f is formed in a curved surface shape. The outer edge portion 25f is provided on a lower portion of the main body member 21f. The outer edge portion 25f has an arc surface so that the main body member 21f does not come into contact with the bottom wall 10b of the accommodation portion 10 even if the main body member 21f swings within the predetermined range. The outer edge portion 25f is formed so as to be able to face the inner surface of the bottom wall 10b of the accommodation portion 10. The arc surface of the outer edge portion 25f generally faces downward and a direction thereof changes according to the swing position of the main body member 21f.

The protruding portion 26f is a portion which protrudes in a claw shape toward the bottom surface in the accommodation portion 10, that is, the inner surface of the bottom wall 10b. The protruding portion 26f has a function of preventing a small falling object which falls into the accommodation space 11 other than the portable electronic device 2 from entering the outside of the accommodation space 11 through the through hole 16f from the accommodation space 11. The protruding portion 26f is provided at a lower end portion of the main body member 21f. Specifically, the protruding portion 26f is provided at a front end of the lower end portion of the main body member 21f and is arranged further on a vehicle front side than the outer edge portion 25f so that the outer edge portion 25f is exposed to the accommodation space 11. The protruding portion 26f extends in a plate shape from the lower end portion of the main body member 21f.

The support portion 20 (specifically, the front support portion 20f) has an air outlet 27. The air outlet 27 is an introduction port for guiding the air sent out by the blower unit 30 to the accommodation space 11 in the accommodation portion 10. The air outlet 27 is provided at the outer edge portion 25f and the protruding portion 26f of the main body member 21f. The air sent out the blower unit 30 is guided from the air outlet 27 to the inner surface of the bottom wall 10b of the accommodation portion 10. The air outlet 27 is formed in a slit shape at the outer edge portion 25f and the protruding portion 26f. The air outlet 27 is formed so that a plurality of slits extend in the up-down direction Z and are lined up in the vehicle width direction Y.

The air outlet 27 provided in the outer edge portion 25f and the air outlet 27 provided in the protruding portion 26f may be integrated with each other and formed in a slit shape, or may be provided in a slit shape so as to be separated from each other. Further, the air outlet 27 provided in the protruding portion 26f may be formed in a comb-teeth shape.

Figure 9:
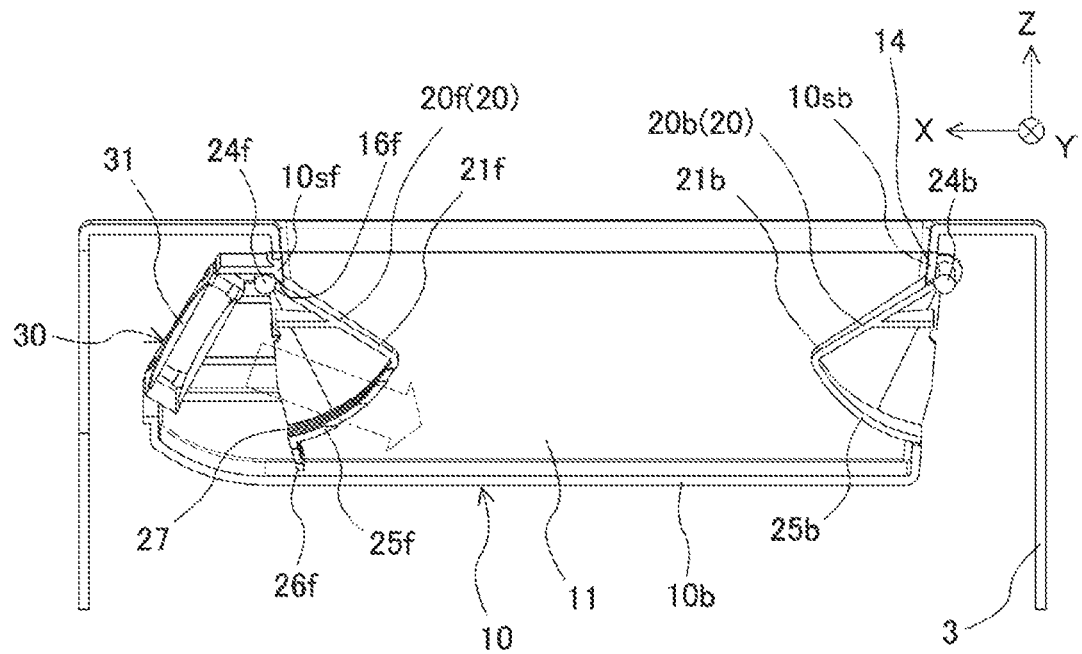
FIG. 9 is a cross-sectional view taken along the line IX-IX illustrated in FIG. 3 when a portable electronic device having a relatively small size is accommodated in an accommodation portion of the accommodation device with the air blowing function of the embodiment.
Figure 10:
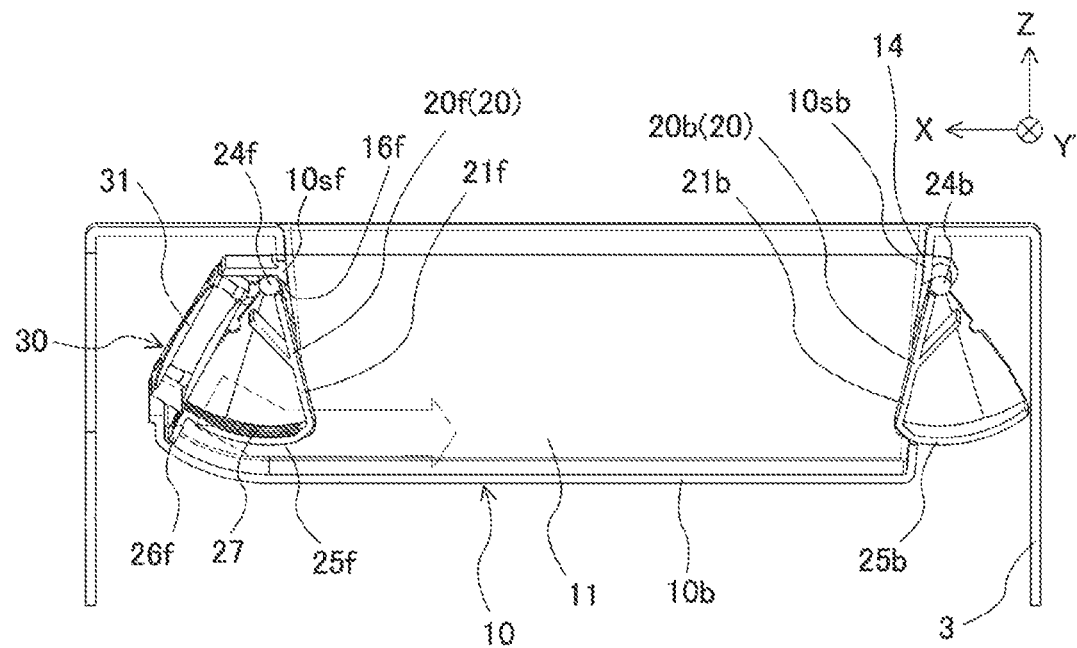
FIG. 10 is a cross-sectional view taken along the line IX-IX illustrated in FIG. 3 when a portable electronic device having a relatively large size is accommodated in the accommodation portion of the accommodation device with the air blowing function of the embodiment.

As described above, the accommodation portion 10 is formed so that the lower portion on the front side of the accommodation space 11 in the vehicle front-rear direction X protrudes forward. That is, the accommodation portion 10 is formed so that the air outlet 27 is exposed to the accommodation space 11 and communicates with the accommodation space 11 regardless of the swinging position of the main body member 21f of the front support portion 20f. As illustrated in FIGS. 9 and 10, the bottom wall 10b is formed so that a vicinity of a connection portion with the front side wall 10sF is curved in the up-down direction Z. This is to facilitate the air sent from the air outlet 27 to the accommodation space 11 to hit a curved surface of the bottom wall 10b and easily flow to a center portion of the accommodation space 11.

The urging member 22f is a member which urges the main body member 21f inward of the accommodation space 11 with the rotating shaft portion 24f as the swing center. The urging member 22f is, for example, a coil spring arranged on the rotating shaft portion 24f. The urging member 22f is attached in a state where one end thereof is supported by the main body member 21f and the other end thereof is supported by the main body member 21f.

In the rear support portion 20b, the main body member 21b is formed in a V shape in cross section so that a vertical central portion protrudes forward in the vehicle front-rear direction X, that is, inward of the accommodation space 11 with respect to upper and lower portions. A tip portion of the vertical central portion protruding forward of the main body member 21b is in contact with the portable electronic device 2 accommodated in the accommodation space 11 and holds the portable electronic device 2. The tip portion has a notch portion 23b.

The notch portion 23b is formed in a shape which encourages the portable electronic device 2 accommodated in the accommodation space 11 to fit in the accommodation space 11 in the above-described predetermined posture state. In particular, the notch portion 23b has an inclined surface which moves the portable electronic device 2 in a direction in contact with the inclined surface 12 of the inclined side wall 10s2 when the pair of support portions 20 pinch the portable electronic device 2 accommodated in the accommodation space 11.

The main body member 21b has a rotating shaft portion 24b and an outer edge portion 25b. The main body member 21b is swingably supported by the accommodation portion 10. The rotating shaft portion 24b is a shaft body which serves as a swing center of the main body member 21b. The rotating shaft portion 24b is provided in an upper portion of the main body member 21b. The rotating shaft portion 24b is inserted into a shaft hole 17b which horizontally extends and is provided in a vicinity of the through hole 16b in the upper portion of the accommodation portion 10. The main body member 21b swings with the rotating shaft portion 24b as the swing center so that a lower portion below the rotating shaft portion 24b moves in the vehicle front-rear direction X through the through hole 16b. The swing of the main body member 21b is regulated within a predetermined range by a regulating member (not illustrated).

The outer edge portion 25b is a planar portion located on a peripheral edge when the rotating shaft portion 24b is centered. The outer edge portion 25b is formed in a curved surface shape. The outer edge portion 25b is provided on a lower portion of the main body member 21b. The outer edge portion 25b has an arc surface so that the main body member 21b does not come into contact with the bottom wall 10b of the accommodation portion 10 even if the main body member 21b swings within the predetermined range. The outer edge portion 25b is formed so as to be able to face the inner surface of the bottom wall 10b of the accommodation portion 10. The arc surface of the outer edge portion 25b generally faces downward and a direction thereof changes according to the swing position of the main body member 21b.

The urging member 22b is a member which urges the main body member 21b inward of the accommodation space 11 with the rotating shaft portion 24b as the swing center. The urging member 22b is, for example, a coil spring arranged on the rotating shaft portion 24b. The urging member 22b is attached in a state where one end thereof is supported by the main body member 21b and the other end thereof is supported by the main body member 21b.

The blower unit 30 is a portion which blows air into the accommodation space 11 in the accommodation portion 10. The blower unit 30 has, for example, a cooling fan 31 which operates by being supplied with power from an external power source. The blower unit 30 is arranged outside the accommodation portion 10. The cooling fan 31 is arranged near a boundary between the inside and outside of the accommodation space 11, and specifically, is arranged outside the air outlet 27 so as to close the through hole 16f of the front side wall 10sF. The cooling fan 31 is rotatably supported by the front side wall 10sF. The blower unit 30 sends the air outside the accommodation space 11 to the accommodation space 11 through the through hole 16f and the air outlet 27 of the front support portion 20f by the operation of the cooling fan 31.

The blower unit 30 may have a tubular introduction path connecting the cooling fan and the through hole 16f. In this case, air from the cooling fan is supplied to the through hole 16f through the introduction path.

The wireless power supply unit 40 is a portion which wirelessly supplies power to the portable electronic device 2 accommodated in the accommodation space 11 in the accommodation portion 10. The wireless power supply unit 40 is connected to an external power source via wiring. The wireless power supply unit 40 has, for example, a power supply pad. The wireless power supply unit 40 is arranged on the back side of the inclined surface 12 (that is, the inner surface of the inclined side wall 10s2) of the accommodation portion 10. The wireless power supply unit 40 is arranged at a position where the power supply efficiency to the target portable electronic device 2 accommodated in the accommodation space 11 is better. Also, the wireless power supply unit 40 is attached so that the power supply pad is in contact with the outer surface of the inclined side wall 10s2 and faces the portable electronic device 2 with pinching the inclined side wall 10s2.

Next, the operation of the accommodation device 1 will be described. In the accommodation device 1, when the portable electronic device 2 is not accommodated in the accommodation space 11 in the accommodation portion 10, the main body members 21f and 21b of the support portions 20f and 20b are urged inward of the accommodation space 11 by the urging force of the urging members 22f and 22b. In this case, a distance between the main body members 21f and 21b of the pair of support portions 20 in the vehicle front-rear direction X is the minimum in the accommodation space 11.

From the above state, when the portable electronic device 2 of the target size is inserted into the accommodation space 11, the main body members 21f and 21b of the support portions 20f and 20b are in contact with the side surfaces or the upper and lower surfaces of the portable electronic device 2. Then, as the insertion progresses, the main body members 21f and 21b are pushed outward from the accommodation space 11 and swung against the urging force of the urging members 22f and 22b. The swing amount or swing angle of each of the main body members 21f and 21b corresponds to the size of the inserted portable electronic device 2. In this case, the portable electronic device 2 inserted in the accommodation space 11 is held in the accommodation space 11 by being pinched between the pair of support portions 20f and 20b.

Also, when the portable electronic device 2 is inserted into the accommodation space 11, regardless of the insertion posture of the portable electronic device 2, the posture of the portable electronic device 2 is changed by the shape of the bottom wall 10b which is inclined with respect to the horizontal and the shape of the support portions 20f and 20b having the notch portions 23f and 23b so that the bottom surface or the side surface is in contact with the bottom wall 10b and the back surface or the front surface of the portable electronic device 2 is in contact with the inclined surface 12 of the inclined side wall 10s2. That is, the portable electronic device 2 is accommodated in the accommodation space 11 in a posture in which the bottom surface or the side surface is in contact with the bottom wall 10b and the back surface or the front surface of the portable electronic device 2 is in contact with the inclined surface 12 of the inclined side wall 10s2.

When the portable electronic device 2 is accommodated in the accommodation space 11, the wireless power supply unit 40 wirelessly supplies power to the portable electronic device 2. When such wireless power supply is performed, the portable electronic device 2 is charged. This charging is performed in a state where the back surface or the front surface of the portable electronic device 2 is in contact with the inclined surface 12 of the inclined side wall 10s2 as described above. Therefore, the portable electronic device 2 can be charged efficiently.

When the portable electronic device 2 is charged as described above, the portable electronic device 2 generates heat. When the wireless power supply unit 40 executes wireless power supply, the blower unit 30 operates to blow air to the accommodation space 11. When the blower unit 30 is operated, the air outside the accommodation space 11 sent out by the cooling fan 31 is sent into the accommodation space 11 through the through hole 16f and the air outlet 27.

The air outlet 27 is provided at the front support portion 20f of the pair of support portions 20 which are in contact with and pinch the portable electronic device 2 accommodated in the accommodation space 11 in the accommodation portion 10. Therefore, the air guided from the blower unit 30 to the accommodation space 11 is sent to the accommodation space 11 in an immediate vicinity of the portable electronic device 2 and the air easily hits the portable electronic device 2 directly. Therefore, the air cooling efficiency of the portable electronic device 2 accommodated in the accommodation space 11 can be improved. Further, the cooling fan 31 is arranged so as to close the through hole 16f of the front side wall 10sF of the accommodation portion 10 and is rotatably supported by the front side wall 10sF. Therefore, the loss of air sent from the outside of the accommodation space 11 to the accommodation space 11 via the air outlet 27 by the operation of the cooling fan 31 is small. Therefore, also in this respect, the air cooling efficiency of the portable electronic device 2 accommodated in the accommodation space 11 can be improved.

Further, the air sent from the blower unit 30 to the accommodation space 11 travels from the lower portion of the front side wall 10sf of the accommodation portion 10 to the vehicle rear side along the inner surface of the bottom wall 10b. Therefore, this air flows to the vehicle rear side in a lower portion of the accommodation space 11 without being hindered and easily travels along the front surface or the back surface of the portable electronic device 2 accommodated in the accommodation space 11. Further, since cold air tends to collect downward, the air sent from the blower unit 30 to the accommodation space 11 tends to collect in the lower portion of the accommodation space 11. Therefore, it is possible to prevent the air heated by the heat generated by the portable electronic device 2 accommodated in the accommodation space 11 from staying in the accommodation space 11 and improve the air cooling efficiency of the portable electronic device 2.

Further, the support portions 20 are such that the swing angles of the main body members 21f and 21b vary depending on the size of the portable electronic device 2 inserted in the accommodation space 11. Therefore, a direction in which the air outlet 27 provided in the outer edge portion 25f of the main body member 21f faces varies depending on the swing angle of the main body member 21f. As illustrated in FIG. 9, when the portable electronic device 2 having a relatively small size is inserted into the accommodation space 11, the air outlet 27 generally faces rearward and far from the main body member 21f. On the other hand, as illustrated in FIG. 10, when the portable electronic device 2 having a relatively large size is inserted into the accommodation space 11, the air outlet 27 generally faces rearward and near from the main body member 21f and faces in a state of being close to perpendicular to the inner surface of the bottom wall 10b.

The bottom wall 10b is formed so that a vicinity of the connection portion with the front side wall 10sF is curved in the up-down direction Z, so that the air sent from the air outlet 27 to the accommodation space 11 can easily flow to the center portion of the accommodation space 11. Therefore, the larger the size of the portable electronic device 2 accommodated in the accommodation space 11, the more the air sent from the air outlet 27 to the accommodation space 11 can flow to the center portion of the accommodation space 11. Therefore, although, in general, the larger the size of the portable electronic device 2, the larger the amount of heat generated, even if the air volume from the air outlet 27 is the same, it is possible to prevent the air cooling efficiency from decreasing when the size of the portable electronic device 2 is large.

Further, the portable electronic device 2 presses the main body members 21f and 21b of the support portions 20f and 20b to the outside of the accommodation space 11 against the urging force of the urging members 22f and 22b while being inserted into the accommodation space 11 and is pinched between the pair of support portions 20f and 20b. Therefore, the holding of the portable electronic device 2 accommodated in the accommodation space 11 by the main body members 21f and 21b is strengthened by the urging force of the urging members 22f and 22b. Therefore, the portable electronic device 2 accommodated in the accommodation space 11 is less likely to rattle and the decrease in air cooling efficiency due to a change in the direction of the air guided from the air outlet 27 to the accommodation space 11 can be suppressed.

Further, the air outlet 27 of the front support portion 20f is formed in a slit shape. According to this structure, for example, even when an object different from the target portable electronic device 2 falls on the bottom wall 10b of the accommodation space 11, the object is likely to be caught by the main body member 21f at the air outlet 27. Therefore, it is possible to prevent the object from entering the outside of the air outlet 27, that is, the cooling fan 31 side, through the air outlet 27 from the inside of the accommodation space 11. As a result, it is possible to prevent foreign matter and dust from being clogged outside the air outlet 27. Thus, it is possible to suppress the deterioration in the ventilation function and suppress the decrease in the air cooling efficiency, and it is possible to suppress frequency of cleaning the outside of the air outlet 27 and improve the maintainability.

Further, the front support portion 20f has the protruding portion 26f provided at the lower end portion of the main body member 21f and protruding toward the inner surface of the bottom wall 10b of the accommodation portion 10. According to this structure, unlike a structure in which the protruding portion 26f does not exist, an object which falls on the bottom wall 10b of the accommodation space 11 is likely to be caught by the protruding portion 26f. Therefore, it is possible to prevent the object from entering the outside of the air outlet 27, that is, the cooling fan 31 side, through the air outlet 27 from the inside of the accommodation space 11. As a result, it is possible to prevent foreign matter and dust from being clogged outside the air outlet 27. Thus, it is possible to suppress the deterioration of the ventilation function and suppress the decrease in the air cooling efficiency, and it is possible to suppress the frequency of cleaning the outside of the air outlet 27 and improve the maintainability.

Further, the air outlet 27 is provided not only in the outer edge portion 25f of the main body member 21f but also in the protruding portion 26f. According to this structure, an area where the air outlet 27 is provided can be expanded as compared with the structure where the air outlet 27 is not provided in the protruding portion 26f. Therefore, it is possible to prevent the flow of air from the blower unit 30 to the accommodation space 11 from being obstructed by the protruding portion 26f and it is possible to suppress a decrease in air cooling efficiency.

Further, the air outlet 27 is provided in the outer edge portion 25f and the protruding portion 26f provided in the lower portion of the main body member 21f so that the air blows toward the inner surface of the bottom wall 10b of the accommodation portion 10. In this structure, it is difficult for the air outlet 27 to be visually recognized from above the opening portion 14 even when the portable electronic device 2 is not accommodated in the accommodation space 11. Therefore, it is possible to suppress the deterioration of the appearance due to the visual recognition of the air outlet 27.

Further, the accommodation space 11 in the accommodation portion 10 is formed so that the area of the upper portion is larger than the area of the lower portion. That is, the accommodation portion 10 is formed so that the opening portion 14 opened on the upper surface is wider than the bottom wall 10b and the inclined surface 12 of the inclined side wall 10s2 faces diagonally upward. According to this structure, the opening portion 14 of the accommodation portion 10 is greatly expanded, and thus the air heated by the heat generated by the portable electronic device 2 in the accommodation space 11 can be easily released to the outside (upward) of the accommodation space 11 through the opening portion 14.

Further, the inclined surface 12 is a surface in contact with the back surface or the front surface of the portable electronic device 2 accommodated in the accommodation space 11. The inclined surface 12 has the guide groove 13 extending along the vehicle front-rear direction X. According to this structure, a gap extending along the vehicle front-rear direction X is formed between the portable electronic device 2 and the inclined surface 12 in a state where the portable electronic device 2 is in contact with the inclined surface 12. Therefore, the air introduced from the blower unit 30 into the accommodation space 11 is allowed to enter the gap between the portable electronic device 2 in contact with the inclined surface 12 and the inclined surface 12, and then the air can flow over an area in the vehicle front-rear direction X where the portable electronic device 2 and the inclined surface 12 are in contact. Therefore, it is possible to prevent heat from being trapped between the portable electronic device 2 and the inclined surface 12, thereby increasing the air cooling efficiency of the portable electronic device 2 accommodated in the accommodation space 11.

In this way, the portable electronic device 2 accommodated in the accommodation space 11 in the accommodation portion 10 and charged by wireless power supply by the wireless power supply unit 40 can be air-cooled by the air blown from the blower unit 30. Therefore, it is possible to suppress a decrease in charging efficiency due to heat generation generated during charging of the portable electronic device 2 accommodated in the accommodation space 11, and thus the portable electronic device 2 accommodated in the accommodation space 11 can be efficiently charged while being air-cooled.

By the way, in the embodiment described above, the air outlet 27 is provided only in the front support portion 20f of the pair of support portions 20. However, the invention is not limited to this and the air outlet 27 may be provided only in the rear support portion 20b. Further, the air outlets 27 may be respectively provided in both the front support portion 20f and the rear support portion 20b.

Further, in the embodiment described above, the air outlet 27 is provided in the front support portion 20f of the pair of support portions 20, but the rear support portion 20b is not provided with any opening. However, the invention is not limited to this. The front support portion 20f may be provided with the air outlet 27 which guides the air outside the accommodation space 11 into the accommodation space 11 and the rear support portion 20b may be provided with an outlet for discharging the air in the accommodation space 11 to the outside of the accommodation space 11. According to the configuration of this modification form, the efficiency of air exchange between the inside and outside of the accommodation space 11 can be increased. In this modification form, the cooling fan 31 of the blower unit 30 may be arranged outside the outlet so as to close the through hole 16b of the rear side wall 10sB of the accommodation portion 10 and air may be sucked into the accommodation space 11 through the air outlet 27 of the front support portion 20f.

Further, in the embodiment described above, the pair of support portions 20 are arranged apart from each other in the vehicle front-rear direction X. However, the invention is not limited to this and may be applied to one in which a pair of support portions 20 are arranged apart from each other in the vehicle width direction Y.

The invention is not limited to the above-described embodiment and modification forms and various modifications can be made without departing from the spirit of the invention.

What is claimed is:

1. An accommodation device with an air blowing function comprising:

an accommodation portion that is formed with an opening portion on an upper surface and accommodates a portable electronic device;

a support portion, arranged so as to protrude from a side surface of the accommodation portion into the accommodation portion, the support portion configured to contact with side surfaces or upper and lower surfaces of the portable electronic device accommodated in the accommodation portion and hold the portable electronic device so as to pinch the portable electronic device; and a blower unit that blows air into the accommodation portion, wherein the support portion has an air outlet for guiding the air sent out by the blower unit to the accommodation portion, wherein the support portion includes:
- a rotating shaft portion that is provided at an upper end;
- an outer edge portion that is formed in a curved-surface shape and is provided with the air outlet;
- a main body member that is swingably supported by the accommodation portion; and
- an urging member which generates an urging force which urges the main body member inward of the accommodation portion with the rotating shaft portion as the swing center, wherein the air sent out by the blower unit is guided from the air outlet to a bottom surface in the accommodation portion.

2. The accommodation device with the air blowing function according to claim 1, wherein
the accommodation portion is formed so that the air outlet communicates with an inside of the accommodation portion regardless of a swing position of the main body member.

3. The accommodation device with the air blowing function according to claim 1, wherein
the air outlet is formed in a slit shape in the support portion.

4. The accommodation device with the air blowing function according to claim 1, wherein
the support portion has a protruding portion which is provided at a lower end portion of the main body member and protrudes toward the bottom surface in the accommodation portion.

5. The accommodation device with the air blowing function according to claim 4, wherein
the air outlet is also provided in the protruding portion.

6. The accommodation device with the air blowing function according to claim 1, wherein
the blower unit has a cooling fan rotatably supported by the accommodation portion.

7. The accommodation device with the air blowing function according to claim 1, wherein:
the accommodation portion has an inclined surface which is in contact with a back surface or a front surface of the portable electronic device to be accommodated and is inclined so as to face diagonally upward; and
the inclined surface has a guide groove which horizontally guides the air guided from the air outlet into the accommodation portion.

8. The accommodation device with the air blowing function according to claim 7, further comprising:
a wireless power supply unit that is arranged on a back side of the inclined surface and wirelessly supplies power to the portable electronic device accommodated in the accommodation portion.

* * * * *